(12) United States Patent
Zhou et al.

(10) Patent No.: US 12,234,193 B2
(45) Date of Patent: Feb. 25, 2025

(54) BISMUTH TUNGSTATE/BISMUTH SULFIDE/MOLYBDENUM DISULFIDE HETEROJUNCTION TERNARY COMPOSITE MATERIAL AND PREPARATION METHOD AND APPLICATION THEREOF

(71) Applicant: QILU UNIVERSITY OF TECHNOLOGY, Shandong (CN)

(72) Inventors: Guowei Zhou, Shandong (CN); Jing Ren, Shandong (CN); Qinghua Gong, Shandong (CN); Bin Sun, Shandong (CN); Tingting Gao, Shandong (CN); Xuefeng Sun, Shandong (CN)

(73) Assignee: QILU UNIVERSITY OF TECHNOLOGY, Shandong (CN)

( * ) Notice: Subject to any disclaimer, the term of this patent is extended or adjusted under 35 U.S.C. 154(b) by 881 days.

(21) Appl. No.: 17/298,677

(22) PCT Filed: Aug. 17, 2020

(86) PCT No.: PCT/CN2020/109620
§ 371 (c)(1),
(2) Date: Jun. 1, 2021

(87) PCT Pub. No.: WO2021/169196
PCT Pub. Date: Sep. 2, 2021

(65) Prior Publication Data
US 2022/0315492 A1    Oct. 6, 2022

(30) Foreign Application Priority Data
Feb. 27, 2020    (CN) .......................... 202010124370.1

(51) Int. Cl.
*B01J 23/31*    (2006.01)
*C04B 35/495*    (2006.01)
(Continued)

(52) U.S. Cl.
CPC .............. *C04B 35/495* (2013.01); *B01J 23/31* (2013.01); *C04B 35/547* (2013.01);
(Continued)

(58) Field of Classification Search
CPC ... C04B 35/495; B01J 23/31; B01J 20/28002; B01J 20/28004; B01J 20/28014; B01J 20/28016
See application file for complete search history.

(56) References Cited

U.S. PATENT DOCUMENTS

| 2012/0189681 | A1 | 7/2012 | Macedo Tavares et al. |
| 2019/0247832 | A1* | 8/2019 | Fang ........................ B01J 35/39 |

FOREIGN PATENT DOCUMENTS

| CN | 104148093 | 11/2014 |
| CN | 105753054 | 7/2016 |

(Continued)

OTHER PUBLICATIONS

Translation CN 108295871 A (Year: 2018).*
(Continued)

*Primary Examiner* — Hoa (Holly) Le
(74) *Attorney, Agent, or Firm* — JCIP GLOBAL INC.

(57) ABSTRACT

The present invention relates to a bismuth tungstate/bismuth sulfide/molybdenum disulfide heterojunction ternary composite material and a preparation method and application thereof. The composite material is composed of bismuth tungstate, bismuth sulfide and molybdenum disulfide in an ordered layered way, $Bi_2WO_6$ is an orthorhombic system, $Bi_2S_3$ is a p-type semiconductor located on a (130) crystal face, $MoS_2$ is a layered transition metal sulfide located on a (002) crystal face, the whole composite material is of a spherical structure with an unsmooth surface, and a layer of nanosheets uniformly grow on an outer layer. The average particle size of composite materials is in the range of 2.4-2.6

(Continued)

µm. The spherical $Bi_2WO_6/Bi_2S_3/MoS_2$ heterojunction ternary composite material prepared in the present invention has good adsorption of Cr(VI) and high catalytic reduction ability under visible light.

9 Claims, 2 Drawing Sheets

(51) Int. Cl.
*C04B 35/547* (2006.01)
*C04B 35/626* (2006.01)

(52) U.S. Cl.
CPC .. *C04B 35/62635* (2013.01); *C04B 2235/326* (2013.01); *C04B 2235/446* (2013.01); *C04B 2235/528* (2013.01); *C04B 2235/5436* (2013.01)

(56) References Cited

FOREIGN PATENT DOCUMENTS

| | | |
|---|---|---|
| CN | 107308957 | 11/2017 |
| CN | 107486199 | 12/2017 |
| CN | 107537469 | 1/2018 |
| CN | 108295871 | 7/2018 |
| CN | 108295871 A * | 7/2018 |
| CN | 109772369 | 5/2019 |
| CN | 111203239 | 5/2020 |

OTHER PUBLICATIONS

Wang et al., Hydrothermal synthesis of flower-like molybdenum disulfide microspheres and their application in electrochemical supercapacitors, RSC Adv.,2018,8, 38945 (Year: 2018).*

Lee et al., Bismuth sulphide-modified molybdenum disulphide as an efficient photocatalyst for hydrogen production under simulated solar light ; doi: 10.1016/j.catcom.2017.05.004 (Year: 2017).*

Translation CN-109772369 (Year: 2019).*

"International Search Report (Form PCT/ISA/210) of PCT/CN2020/109620," mailed on Nov. 12, 2020, with English translation thereof, pp. 1-7.

"Written Opinion of the International Searching Authority (Form PCT/ISA/237) of PCT/CN2020/109620," mailed on Nov. 12, 2020, with English translation thereof, pp. 1-10.

"Office Action of China Counterpart Application", issued on Nov. 16, 2020, with English translation thereof, p. 1-p. 20.

Sangeeta Adhikari et al., "Synthesis of Bi2S3/Bi2W06 hierarchical microstructures for enhanced visible light driven photocatalytic degradation and photoelectrochemical sensing of ofloxacin," Chemical Engineering Journal, vol. 354, Aug. 2018, pp. 1-46.

* cited by examiner ature of bismuth tungstate ($Bi_2WO_6$), absorption and utilization of light by a photocatalyst are facilitated, abilities to adsorb and degrade Cr(VI) are improved, and improvement of a removal effect on Cr(VI) is facilitated.

BISMUTH TUNGSTATE/BISMUTH SULFIDE/MOLYBDENUM DISULFIDE HETEROJUNCTION TERNARY COMPOSITE MATERIAL AND PREPARATION METHOD AND APPLICATION THEREOF

CROSS-REFERENCE TO RELATED APPLICATION

This application is a 371 of international application of PCT application serial no. PCT/CN2020/109620, filed on Aug. 17, 2020, which claims the priority benefit of China application no. 202010124370.1, filed on Feb. 27, 2020. The entirety of each of the above mentioned patent applications is hereby incorporated by reference herein and made a part of this specification.

BACKGROUND

Technical Field

The present invention belongs to the technical field of synthesis of photocatalytic materials, and specifically relates to a bismuth tungstate/bismuth sulfide/molybdenum disulfide heterojunction ternary composite material and a preparation method and application thereof.

Information of the Related Art part is merely disclosed to increase the understanding of the overall background of the present invention, but is not necessarily regarded as acknowledging or suggesting, in any form, that the information constitutes the prior art known to a person of ordinary skill in the art.

At present, pollution caused by heavy metal ions becomes more and more serious. Different from other pollutants, heavy metal pollution which can be spread through food chains and has the characteristics of difficult degradation and easy accumulation is one of the major problems of environmental governance in the world. Among them, Cr(VI) pollution in leather tanning, electroplating, pigment synthesis and chromate industrial wastewater is particularly serious, and has high toxicity, potential carcinogenicity, non-biodegradability and great harm to the ecological environment and human health. Existing methods for removing Cr(VI) in water include an adsorption method, an ion exchange method, a bioremediation method, a photocatalytic reduction method and a chemical precipitation method. Among them, the photocatalytic reduction method of Cr(VI) is regarded as a simple, green and efficient method.

$Bi_2WO_6$, as a typical Aurivillius oxide, is of a perovskite layered structure and is a common narrow band gap n-type semiconductor. Due to its safety, non-toxicity, easy adjustment of structure and morphology, excellent photocatalytic performance, stable physical and chemical properties and other characteristics, $Bi_2WO_6$ is widely used in photocatalysis. However, due to rapid recombination of photogenerated electron hole pairs and low surface adsorption ability, the photocatalytic efficiency of $Bi_2WO_6$ is low.

SUMMARY

Technical Problem

In view of the problems in the prior art, an objective of the present invention is to provide a bismuth tungstate/bismuth sulfide/molybdenum disulfide heterojunction ternary composite material and a preparation method and application thereof. According to the present invention, by adjusting the morphology of bismuth tungstate ($Bi_2WO_6$), absorption and utilization of light by a photocatalyst are facilitated, abilities to adsorb and degrade Cr(VI) are improved, and improvement of a removal effect on Cr(VI) is facilitated.

In order to solve the above technical problems, the technical solutions of the present invention are as follows.

In a first aspect, a bismuth tungstate/bismuth sulfide/molybdenum disulfide heterojunction ternary composite material is composed of bismuth tungstate, bismuth sulfide and molybdenum disulfide in an ordered layered way. $Bi_2WO_6$ is an orthorhombic system. $Bi_2S_3$ is a p-type semiconductor located on a (130) crystal face. $MoS_2$ is a layered transition metal sulfide located on a (002) crystal face. The whole composite material is of a spherical structure with an unsmooth surface, and a layer of nanosheets uniformly grow on an outer layer. The average particle size of composite materials is in the range of 2.4-2.6 μm.

In the ternary composite material of the present invention, bismuth tungstate ($Bi_2WO_6$), bismuth sulfide ($Bi_2S_3$) and molybdenum disulfide ($MoS_2$) cooperate with one another to form a special heterojunction structure. First, due to spherical structures of the nanosheets of bismuth tungstate, absorption of light by a photocatalyst is facilitated, and reflection paths of incident light in the catalyst are increased, so that light absorption and utilization performance of a material is improved, and the purpose of improving the photocatalytic performance of the material is achieved. $Bi_2S_3$, as a p-type semiconductor, has a narrow band gap (1.2-1.7 eV) and excellent stability. $MoS_2$, as a typical layered transition metal sulfide, is of a special sandwich structure with three stacked atomic layers (S—Mo—S). Due to compounding of spherical $Bi_2WO_6$, the narrow band gap semiconductor $Bi_2S_3$ and $MoS_2$, the surface adsorption ability of $Bi_2WO_6$ can be improved, the spectral response range can be widened, and recombination of photogenerated electron hole pairs can be slowed down.

In the present invention, a bismuth tungstate/bismuth sulfide/molybdenum disulfide heterojunction ternary composite material with a different structure is provided and can be effectively used for photocatalytic reduction of Cr(VI). In a second aspect, a preparation method of the bismuth tungstate/bismuth sulfide/molybdenum disulfide heterojunction ternary composite material is provided, and the method includes preparing spherical bismuth tungstate, dispersing the spherical bismuth tungstate in water, adding $Na_2MoO_4 \cdot 2H_2O$ and thiourea, and performing a hydrothermal reaction on the mixed solution to obtain a reaction product, namely the $Bi_2WO_6/Bi_2S_3/MoS_2$ heterojunction ternary composite material.

A preparation method of spherical bismuth tungstate includes: dispersing a surfactant polyvinylpyrrolidone (PVP) K30 in a mixed solution of water, absolute ethanol and glacial acetic acid, and then adding a bismuth source and a tungsten source for solvothermal treatment to prepare $Bi_2WO_6$ microspheres which are self-assembled from nanosheets. The microspheres have high structural stability and great visible light response. Compared with existing preparation methods of spherical bismuth tungstate, spherical bismuth tungstate prepared by using the preparation method of the present invention is of a compact spherical structure, and sheet-like structures are arranged in a circular ring; the preparation method is also different, and according to a principle of the preparation method of the present invention, PVP K30, the bismuth source and the tungsten source are dispersed in a mixed solution of water, absolute ethanol and glacial acetic acid for a solvothermal reaction.

In a reaction process, PVP K30 acting as a template promotes reorganization and self-assembly of nanoparticles in the solution into nanosheets through directional aggregation, and the nanosheets are further assembled into microspheres in a subsequent growing process.

In some embodiments of the present invention, a preparation method of spherical bismuth tungstate includes adding bismuth nitrate pentahydrate ($Bi(NO_3)_3 \cdot 5H_2O$) and PVP K30 into a mixed solution of water, absolute ethanol and glacial acetic acid to obtain a mixed solution A;

mixing an aqueous solution B of sodium tungstate dihydrate and the mixed solution A to obtain a mixed solution b, and then performing a solvothermal reaction on the mixed solution b to obtain spherical bismuth tungstate.

In some embodiments of the present invention, a mass ratio of bismuth nitrate pentahydrate to PVP K30 is (0.2-0.25):1.

In some embodiments of the present invention, a volume ratio of water to absolute ethanol to glacial acetic acid in the mixed solution of water, absolute ethanol and glacial acetic acid is (2-4):1:1.

In some embodiments of the present invention, a molar ratio of $Bi(NO_3)_3 \cdot 5H_2O$ to $Na_2WO_4 \cdot 2H_2O$ in the mixed solution b is (1.5-2.5):1.

In some embodiments of the present invention, the solvothermal reaction temperature is 150-200° C., and the reaction time is 15-20 hours.

A preparation method of the heterojunction ternary composite material.

In some embodiments of the present invention, an adding ratio of spherical $Bi_2WO_6$ to $Na_2MoO_4 \cdot 2H_2O$ to thiourea is 200 mg:(0.075-0.30) g:(0.15-0.60) g; preferably 200 mg:0.20 g:0.40 g. The $Bi_2WO_6/Bi_2S_3/MoS_2$ heterojunction ternary composite material prepared according to this adding ratio has the best photocatalytic performance. The surface structure of the obtained spherical heterojunction ternary composite material is affected by an adding ratio.

In some embodiments of the present invention, the hydrothermal reaction condition is 180-220° C., and the reaction time is 22-26 hours.

In a third aspect, application of the bismuth tungstate/bismuth sulfide/molybdenum disulfide heterojunction ternary composite material in catalytic materials, sensing materials, photoelectric materials, magnetic materials, electronic materials and energy storage materials is provided.

The Present Invention has the Following Beneficial Effects:
1. The preparation method of the spherical $Bi_2WO_6/Bi_2S_3/MoS_2$ heterojunction ternary composite material of the present invention is simple in process, easy to operate and low in cost.
2. According to the spherical $Bi_2WO_6/Bi_2S_3/MoS_2$ heterojunction ternary composite material prepared in the present invention, due to synergy among $Bi_2WO_6$, $Bi_2S_3$ and $MoS_2$, light absorption is enhanced, and recombination of photogenerated electron hole pairs is slowed down.
3. The spherical $Bi_2WO_6/Bi_2S_3/MoS_2$ heterojunction ternary composite material prepared in the present invention has good adsorption of Cr(VI) and high catalytic reduction ability under visible light.
4. Compared with the prior art, the present invention provides a new method for safe and efficient reduction of Cr(VI). The method is simple, easy to operate and low in cost, the photocatalytic reduction efficiency is high, addition of other chemical substances into a photocatalytic reduction reaction system is not needed, and there is no secondary pollution.

DESCRIPTION OF THE EMBODIMENTS

Figure 1:
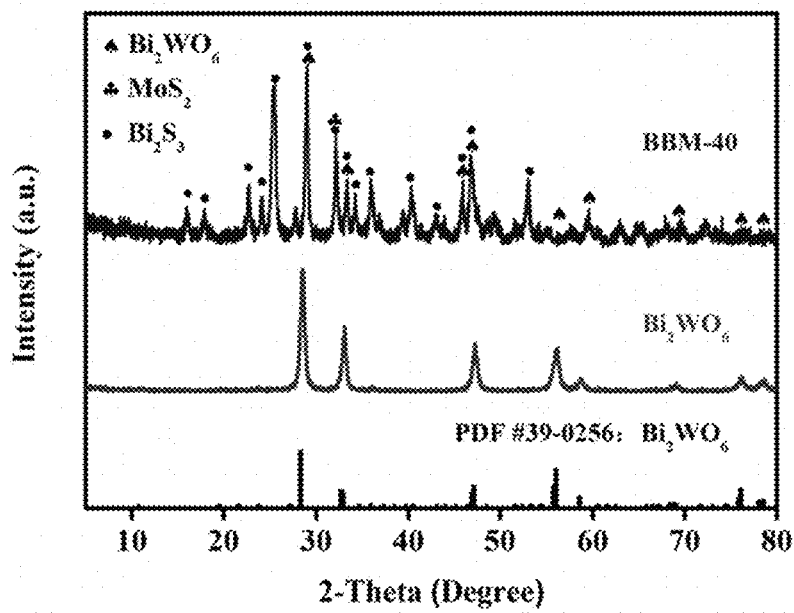
FIG. 1 shows X-ray diffraction (XRD) patterns of spherical $Bi_2WO_6$ and spherical $Bi_2WO_6/Bi_2S_3/MoS_2$ prepared in Embodiment 3 of the present invention.

It should be pointed out that the following detailed descriptions are all illustrative and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely for describing specific implementations, and are not intended to limit exemplary implementations according to this application. As used herein, the singular form is also intended to include the plural form unless the context clearly dictates otherwise. In addition, it should be further understood that, terms "comprise" and/or "include" used in this specification indicate that there are features, steps, operations, devices, components, and/or combinations thereof.

Embodiment 1

(1) Preparation of Spherical $Bi_2WO_6$

A solution A and a solution B were prepared during synthesis of a spherical $Bi_2WO_6$ precursor. 2 mmol of $Bi(NO_3)_3 \cdot 5H_2O$ and 4 g of PVP K30 were added into 50 mL of a mixed solution of water, absolute ethanol and glacial acetic acid (volume ratio 3:1:1) and stirred at room temperature until the solution was clear to obtain the solution A. 1 mmol of $Na_2WO_4 \cdot 2H_2O$ was added into 20 mL of $H_2O$ and subjected to ultrasonic treatment for 30 minutes to obtain the solution B. The solution B was added dropwise into the solution A and stirred for 60 minutes to obtain a uniform suspension. The suspension was transferred into a 100 mL polytetrafluoroethylene lined autoclave for a solvothermal reaction at 180° C. for 18 hours. After natural cooling to room temperature, centrifugation, washing, drying and grinding were performed to obtain a light yellow $Bi_2WO_6$ powder.

(2) Preparation of a Spherical Bi$_2$WO$_6$/Bi$_2$S$_3$/MoS$_2$ Heterojunction Ternary Composite Material 200 mg of the Bi$_2$WO$_6$ powder was dispersed into 40 mL of water by ultrasonic treatment. 0.075 g of Na$_2$MoO$_4$·2H$_2$O and 0.15 g of thiourea were added and stirred for 1 hour. The obtained uniform suspension was transferred into a 100 mL polytetrafluoroethylene lined autoclave for a hydrothermal reaction at 200° C. for 24 hours. After natural cooling to room temperature, centrifugation, washing, drying and grinding were performed to obtain a spherical Bi$_2$WO$_6$/Bi$_2$S$_3$/MoS$_2$ heterojunction ternary composite material. The product obtained according to this adding ratio was named as BBM-20 for convenient description.

Embodiment 2

(1) Preparation of Spherical Bi$_2$WO$_6$

A solution A and a solution B were prepared during synthesis of a spherical Bi$_2$WO$_6$ precursor. 2 mmol of Bi(NO$_3$)$_3$·5H$_2$O and 4 g of PVP K30 were added into 50 mL of a mixed solution of water, absolute ethanol and glacial acetic acid (volume ratio 3:1:1) and stirred at room temperature until the solution was clear to obtain the solution A. 1 mmol of Na$_2$WO$_4$·2H$_2$O was added into 20 mL of H$_2$O and subjected to ultrasonic treatment for 30 minutes to obtain the solution B. The solution B was added dropwise into the solution A and stirred for 60 minutes to obtain a uniform suspension. The suspension was transferred into a 100 mL polytetrafluoroethylene lined autoclave for a solvothermal reaction at 180° C. for 18 hours. After natural cooling to room temperature, centrifugation, washing, drying and grinding were performed to obtain a light yellow Bi$_2$WO$_6$ powder.

(2) Preparation of a Spherical Bi$_2$WO$_6$/Bi$_2$S$_3$/MoS$_2$ Heterojunction Ternary Composite Material 200 mg of the Bi$_2$WO$_6$ powder was dispersed into 40 mL of water by ultrasonic treatment. 0.13 g of Na$_2$MoO$_4$·2H$_2$O and 0.26 g of thiourea were added and stirred for 1 hour. The obtained uniform suspension was transferred into a 100 mL polytetrafluoroethylene lined autoclave for a hydrothermal reaction at 200° C. for 24 hours. After natural cooling to room temperature, centrifugation, washing, drying and grinding were performed to obtain a spherical Bi$_2$WO$_6$/Bi$_2$S$_3$/MoS$_2$ heterojunction ternary composite material. The product obtained according to this adding ratio was named as BBM-30 for convenient description.

Embodiment 3

(1) Preparation of Spherical Bi$_2$WO$_6$

A solution A and a solution B were prepared during synthesis of a spherical Bi$_2$WO$_6$ precursor. 2 mmol of Bi(NO$_3$)$_3$·5H$_2$O and 4 g of PVP K30 were added into 50 mL of a mixed solution of water, absolute ethanol and glacial acetic acid (volume ratio 3:1:1) and stirred at room temperature until the solution was clear to obtain the solution A. 1 mmol of Na$_2$WO$_4$·2H$_2$O was added into 20 mL of H$_2$O and subjected to ultrasonic treatment for 30 minutes to obtain the solution B. The solution B was added dropwise into the solution A and stirred for 60 minutes to obtain a uniform suspension. The suspension was transferred into a 100 mL polytetrafluoroethylene lined autoclave for a solvothermal reaction at 180° C. for 18 hours. After natural cooling to room temperature, centrifugation, washing, drying and grinding were performed to obtain a light yellow Bi$_2$WO$_6$ powder.

(2) Preparation of a Spherical Bi$_2$WO$_6$/Bi$_2$S$_3$/MoS$_2$ Heterojunction Ternary Composite Material 200 mg of the Bi$_2$WO$_6$ powder was dispersed into 40 mL of water by ultrasonic treatment, 0.20 g of Na$_2$MoO$_4$·2H$_2$O and 0.40 g of thiourea were added and stirred for 1 hour. The obtained uniform suspension was transferred into a 100 mL polytetrafluoroethylene lined autoclave for a hydrothermal reaction at 200° C. for 24 hours. After natural cooling to room temperature, centrifugation, washing, drying and grinding were performed to obtain a spherical Bi$_2$WO$_6$/Bi$_2$S$_3$/MoS$_2$ heterojunction ternary composite material. The product obtained according to this adding ratio was named as BBM-40 for convenient description.

The morphology and structure of prepared samples were characterized by XRD, SEM, TEM and HRTEM, as shown in FIG. 1, FIG. 2, FIG. 3 and FIG. 4.

FIG. 1 shows XRD patterns of spherical Bi$_2$WO$_6$ and spherical Bi$_2$WO$_6$/Bi$_2$S$_3$/MoS$_2$ prepared in Embodiment 3 of the present invention. Pure Bi$_2$WO$_6$ has diffraction peaks when 2θ is 28.299°, 32.790°, 47.138°, 55.990°, 58.538°, 68.754°, 76.075° and 78.534°, crystal face diffraction is (131), (200), (202), (133), (262), (400), (2102) and (204) and is consistent with the JCPDS 39-0256 standard card, and Pure Bi$_2$WO$_6$ belongs to an orthorhombic system. For spherical Bi$_2$WO$_6$/Bi$_2$S$_3$/MoS$_2$, a diffraction peak at 25° corresponds to a (130) crystal face of Bi$_2$S$_3$, and a diffraction peak at 32° can be ascribed to a (100) crystal face of MoS$_2$. It is shown through XRD results that pure-phase spherical Bi$_2$WO$_6$ and a spherical Bi$_2$WO$_6$/Bi$_2$S$_3$/MoS$_2$ ternary composite material are successfully prepared.

Figure 2:
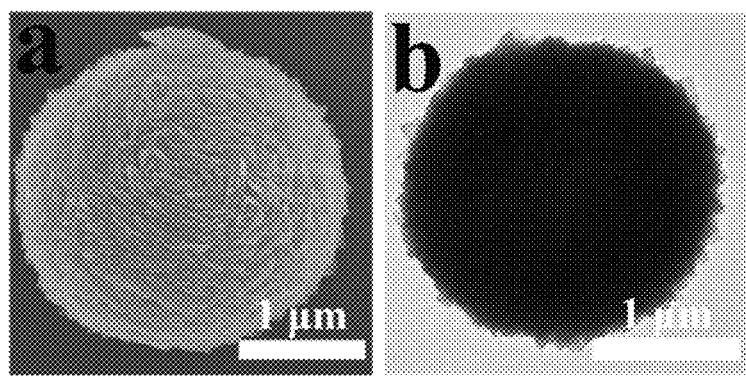
FIG. 2 is an image of spherical $Bi_2WO_6$ prepared in Embodiment 3 of the present invention; wherein
(a) a scanning electron microscope (SEM) image of spherical $Bi_2WO_6$, and (b) a transmission electron microscope (TEM) image of spherical $Bi_2WO_6$.

FIG. 2 is an image of spherical Bi$_2$WO$_6$ prepared in Embodiment 3 of the present invention, wherein (a) a SEM image of spherical Bi$_2$WO$_6$, and (b) a TEM image of spherical Bi$_2$WO$_6$. As shown in the FIGURES, single Bi$_2$WO$_6$ is of a spherical structure self-assembled from nanosheets and has a particle size of about 2.5 μm.

Figure 3:
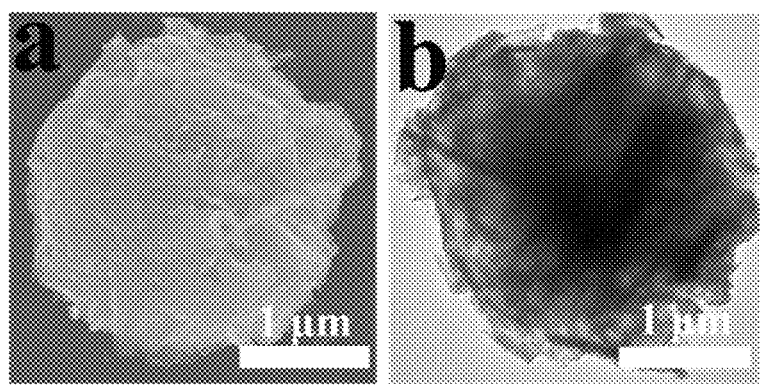
FIG. 3 is an image of spherical $Bi_2WO_6/Bi_2S_3/MoS_2$ prepared in Embodiment 3 of the present invention; wherein
(a) a scanning electron microscope (SEM) image of spherical $Bi_2WO_6/Bi_2S_3/MoS_2$, and (b) a transmission electron microscope (TEM) image of spherical $Bi_2WO_6/Bi_2S_3/MoS_2$.

FIG. 3 is an image of spherical Bi$_2$WO$_6$/Bi$_2$S$_3$/MoS$_2$ prepared in Embodiment 3 of the present invention, wherein (a) a SEM image of spherical Bi$_2$WO$_6$/Bi$_2$S$_3$/MoS$_2$, and (b) a TEM image of spherical Bi$_2$WO$_6$/Bi$_2$S$_3$/MoS$_2$. As shown in the figures, Bi$_2$WO$_6$/Bi$_2$S$_3$/MoS$_2$ is of a spherical structure. Compared with Bi$_2$WO$_6$, the particle size is not changed significantly, and a layer of nanosheets uniformly grow on an outer layer. It can be found by comparing FIGS. 2(a) and 3(a) that different from pure Bi$_2$WO$_6$, the nanosheets on the surface of the composite material are curled and low in thickness, and thus it can be seen that other substances grow on the surfaces of Bi$_2$WO$_6$ microspheres.

Figure 4:
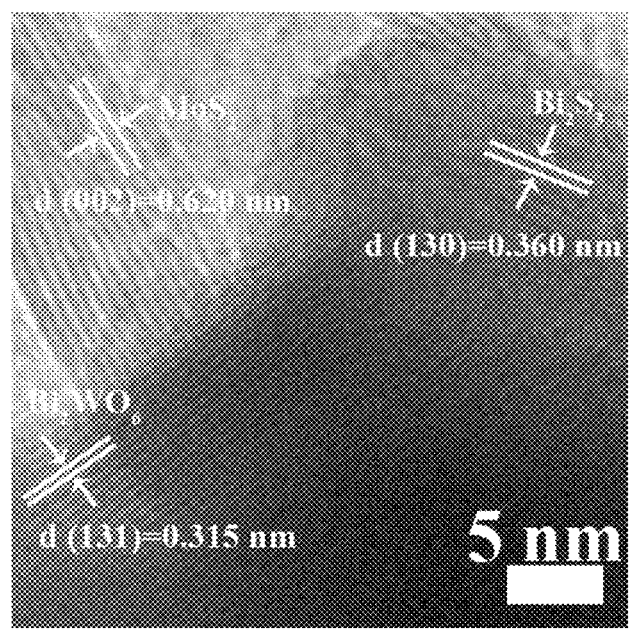
FIG. 4 is a high-resolution transmission electron microscope (HRTEM) image of spherical $Bi_2WO_6/Bi_2S_3/MoS_2$ prepared in Embodiment 3 of the present invention.

FIG. 4 is an HRTEM image of a spherical Bi$_2$WO$_6$/Bi$_2$S$_3$/MoS$_2$ heterojunction ternary composite material prepared in Embodiment 3 of the present invention. It can be seen from the figures that a Bi$_2$WO$_6$/Bi$_2$S$_3$/MoS$_2$ heterojunction ternary composite material is successfully prepared.

Embodiment 4

(1) Preparation of Spherical Bi$_2$WO$_6$

A solution A and a solution B were prepared during synthesis of a spherical Bi$_2$WO$_6$ precursor. 2 mmol of Bi(NO$_3$)$_3$·5H$_2$O and 4 g of PVP K30 were added into 50 mL of a mixed solution of water, absolute ethanol and glacial acetic acid (volume ratio 3:1:1) and stirred at room temperature until the solution was clear to obtain the solution A. 1 mmol of $Na_2WO_4 \cdot 2H_2O$ was added into 20 mL of $H_2O$ and subjected to ultrasonic treatment for 30 minutes to obtain the solution B. The solution B was added dropwise into the solution A and stirred for 60 minutes to obtain a uniform suspension. The suspension was transferred into a 100 mL polytetrafluoroethylene lined autoclave for a solvothermal reaction at 180° C. for 18 hours. After natural cooling to room temperature, centrifugation, washing, drying and grinding were performed to obtain a light yellow $Bi_2WO_6$ powder.

(2) Preparation of a Spherical $Bi_2WO_6/Bi_2S_3/MoS_2$ Heterojunction Ternary Composite Material 200 mg of the $Bi_2WO_6$ powder was dispersed into 40 mL of water by ultrasonic treatment. 0.30 g of $Na_2MoO_4 \cdot 2H_2O$ and 0.60 g of thiourea were added and stirred for 1 hour. The obtained uniform suspension was transferred into a 100 mL polytetrafluoroethylene lined autoclave for a hydrothermal reaction at 200° C. for 24 hours. After natural cooling to room temperature, centrifugation, washing, drying and grinding were performed to obtain a spherical $Bi_2WO_6/Bi_2S_3/MoS_2$ heterojunction ternary composite material The product obtained according to this adding ratio was named as BBM-50 for convenient description.

Embodiment 5

The photocatalytic performance of the spherical $Bi_2WO_6/Bi_2S_3/MoS_2$ heterojunction ternary composite as a photocatalytic material was evaluated by reducing Cr(VI) under visible light. The process was as follows: a catalyst (0.4 g $L^{-1}$) was added into a Cr(VI) solution (40 mg $L^{-1}$, based on Cr(VI) in a $K_2Cr_2O_7$ solution). Then, the pH value of an initial solution was adjusted to 2 with 1 M HCl solution. Ultrasonic treatment was performed for 4 minutes. Before irradiation, a suspension was stirred for 60 minutes in a dark place to establish an adsorption-desorption balance. During irradiation with a xenon lamp (300 W, 2 higher than 400 nm), 3 mL of the suspension was taken from a reaction vessel at a regular interval and centrifuged (9,000 r $min^{-1}$, 10 minutes), and then a supernatant was collected with a 0.22 μm filter membrane syringe to remove residual particles. At last, the absorbance at 540 nm at different times was measured by using a diphenylcarbazide (DPC) method so as to obtain the concentration of Cr(VI).

Figure 5:
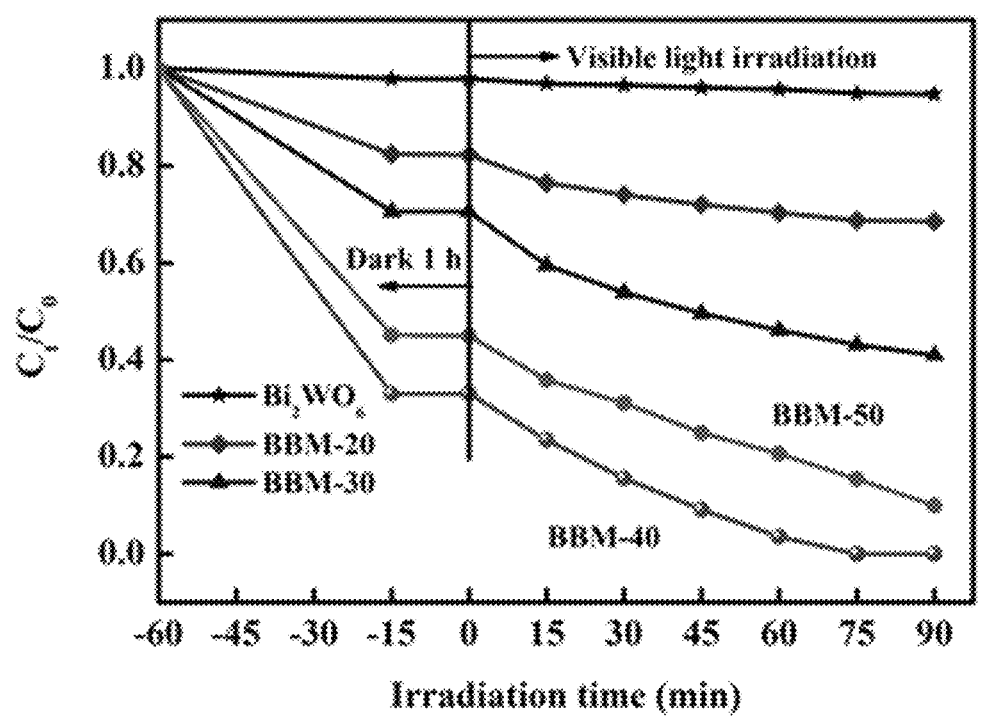
FIG. 5 shows the effect of removing 40 mg $L^{-1}$ Cr(VI) (based on $K_2Cr_2O_7$) under visible light by samples prepared in Embodiment 1, Embodiment 2, Embodiment 3 and Embodiment 4 of the present invention (the use amount of a catalyst is 0.4 g $L^{-1}$).

FIG. 5 shows the effect of removing 40 mg $L^{-1}$ Cr(VI) under visible light in Embodiment 5 (samples $Bi_2WO_6$, BBM-20, BBM-30, BBM-40 and BBM-50) of the present invention. It can be seen from the figure that BBM-40 has the best photocatalytic performance.

It can be seen from tests on the products in the embodiments that with the increased addition amount of $Na_2MoO_4 \cdot 2H_2O$ and thiourea, the morphology of materials growing on the $Bi_2WO_6$ microspheres are changed from nanoparticles into nanosheets. When 0.20 g of $Na_2MoO_4 \cdot 2H_2O$ and 0.40 g of thiourea are added, a layer of nanosheets grow uniformly on the surface of $Bi_2WO_6$. However, when the addition amount of the Mo source and S source is further increased, $MoS_2$ aggregates on the surface of a sample can be clearly observed. At the same time, with the increased addition amount of $Na_2MoO_4 \cdot 2H_2O$ and thiourea, the ability of the composite material for photocatalytic reduction of Cr(VI) is first improved and then reduced. According to exploration of a series of influencing factors, it is found by the inventors that experimental conditions in Embodiment 3 of the present invention are the optimal conditions, and a product has a regular morphology and high photocatalytic reduction ability.

According to a Chinese patent with an application publication number of CN 105753054 A (application number 201610082396.8), a microspherical three-dimensional hierarchical micro-nano-structured bismuth tungstate photocatalytic material and a preparation method thereof are disclosed. According to the method, sodium tungstate dihydrate and bismuth nitrate pentahydrate are used as raw materials, the pH of a solution is adjusted to 1 with nitric acid in a preparation process, an experimental process is relatively cumbersome and high in energy consumption, and a large amount of strongly acidic waste liquid is produced after a reaction, resulting in environmental pollution. Compared with this patent, the experimental process of the present invention is simpler, easy to operate, safe and free of pollution.

The above descriptions are merely preferred embodiments of the present invention and are not intended to limit the present invention. Those skilled in the art may make various modifications and changes to the present invention. Any modification, equivalent replacement, or improvement made within the spirit and principle of the present invention shall fall within the protection scope of the present invention.

What is claimed is:

1. A bismuth tungstate/bismuth sulfide/molybdenum disulfide heterojunction ternary composite material, composed of bismuth tungstate, bismuth sulfide and molybdenum disulfide in an ordered layered way, wherein $Bi_2WO_6$ is an orthorhombic system, $Bi_2S_3$ is a p-type semiconductor located on a (130) crystal face, $MoS_2$ is a layered transition metal sulfide located on a (002) crystal face, the whole composite material is of a spherical structure with an unsmooth surface, and a layer of nanosheets forms an outer layer; the average particle size of composite materials is in the range of 2.4-2.6 μm.

2. A preparation method of the bismuth tungstate/bismuth sulfide/molybdenum disulfide heterojunction ternary composite material according to claim 1, wherein the method comprises: preparing a spherical bismuth tungstate, dispersing the spherical bismuth tungstate in water, adding $Na_2MoO_4 \cdot 2H_2O$ and thiourea, and performing a hydrothermal reaction on the mixed solution to obtain a reaction product, which is the $Bi_2WO_6/Bi_2S_3/MoS_2$ heterojunction ternary composite material.

3. The preparation method of the bismuth tungstate/bismuth sulfide/molybdenum disulfide heterojunction ternary composite material according to claim 2, wherein a preparation method of the spherical bismuth tungstate comprises:
   adding bismuth nitrate pentahydrate and polyvinylpyrrolidone K30 into a mixed solution of water, absolute ethanol and glacial acetic acid to obtain a mixed solution A; and
   mixing an aqueous solution B of sodium tungstate dihydrate and the mixed solution A to obtain a mixed solution b, and then performing a solvothermal reaction on the mixed solution b to obtain the spherical bismuth tungstate.

4. The preparation method of the bismuth tungstate/bismuth sulfide/molybdenum disulfide heterojunction ternary composite material according to claim 3, wherein a mass ratio of bismuth nitrate pentahydrate to polyvinylpyrrolidone K30 is (0.2-0.25):1.

5. The preparation method of the bismuth tungstate/bismuth sulfide/molybdenum disulfide heterojunction ternary composite material according to claim 3, wherein a volume ratio of water to absolute ethanol to glacial acetic acid in the mixed solution of water, absolute ethanol and glacial acetic acid is (2-4): 1:1.

6. The preparation method of the bismuth tungstate/bismuth sulfide/molybdenum disulfide heterojunction ternary composite material according to claim 3, wherein a molar ratio of $Bi(NO_3)_3 \cdot 5H_2O$ to $Na_2WO_4 \cdot 2H_2O$ in the mixed solution b is (1.5-2.5):1.

7. The preparation method of the bismuth tungstate/bismuth sulfide/molybdenum disulfide heterojunction ternary composite material according to claim 3, wherein the solvothermal reaction temperature is 150-200° C., and the reaction time is 15-20 hours.

8. The preparation method of the bismuth tungstate/bismuth sulfide/molybdenum disulfide heterojunction ternary composite material according to claim 2, wherein an adding ratio of spherical $Bi_2WO_6$ to $Na_2MoO_4 \cdot 2H_2O$ to thiourea is 200 mg:(0.075-0.30) g:(0.15-0.60) g.

9. The preparation method of the bismuth tungstate/bismuth sulfide/molybdenum disulfide heterojunction ternary composite material according to claim 2, wherein the hydrothermal reaction condition is 180-220° C., and the reaction time is 22-26 hours.

* * * * *